Figure 8:
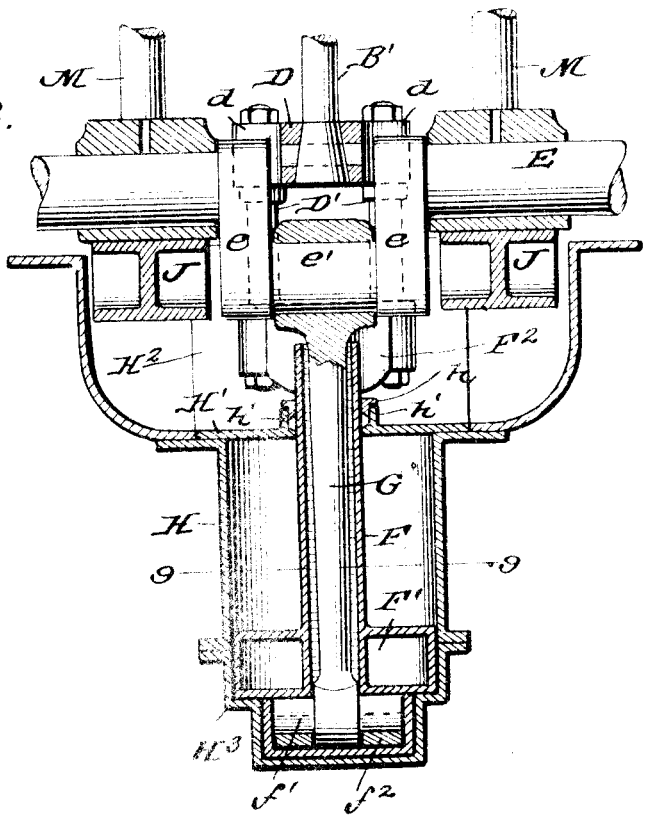

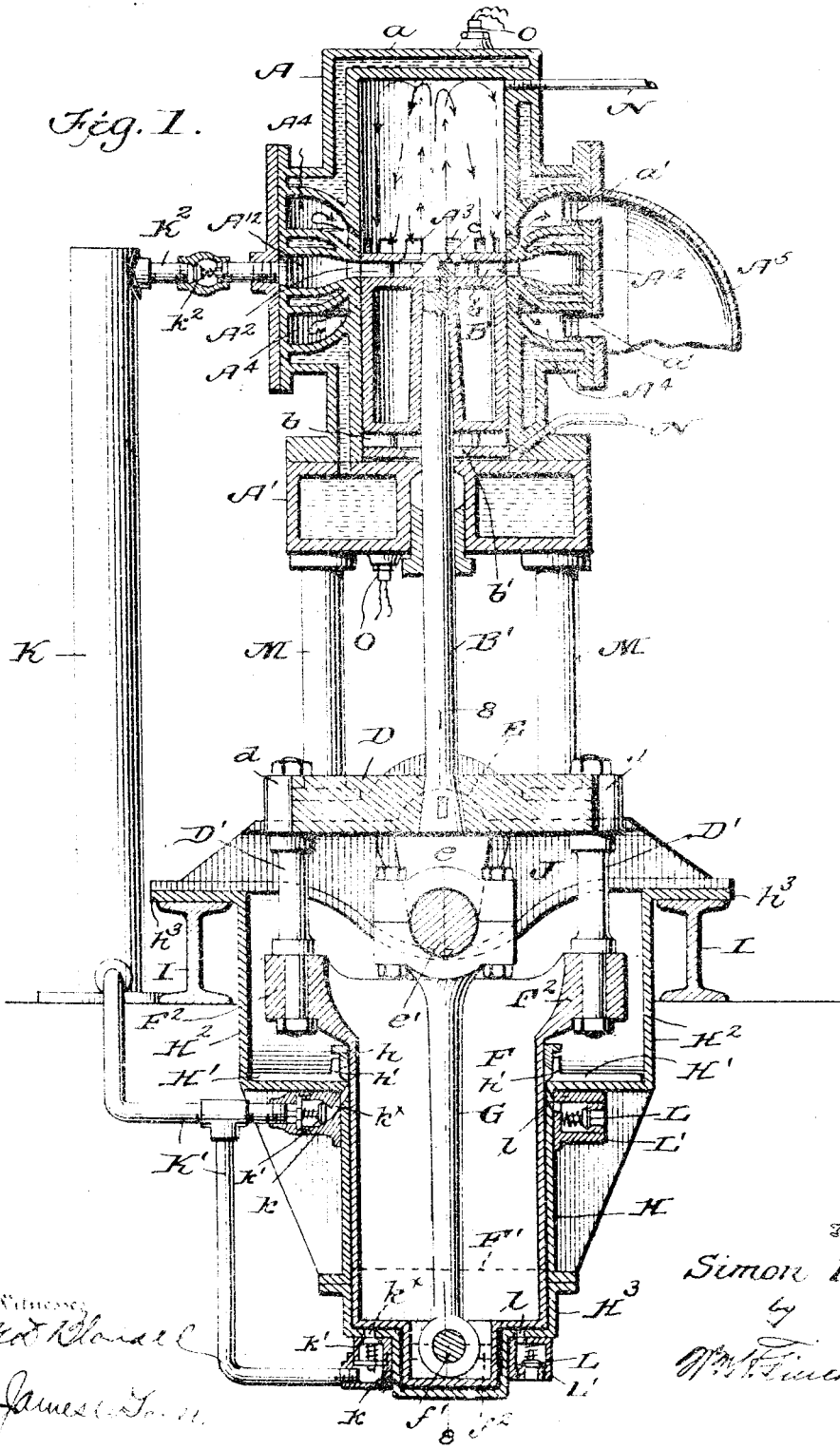

S. LAKE.
INTERNAL COMBUSTION ENGINE.
APPLICATION FILED NOV. 21, 1910.
1,095,002.
Patented Apr. 28, 1914.
3 SHEETS—SHEET 2.
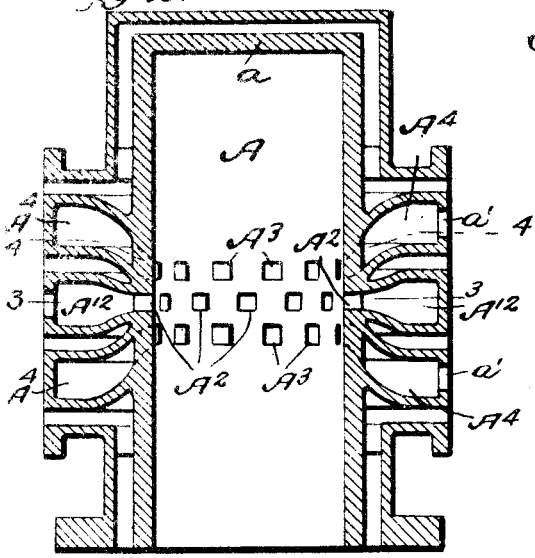
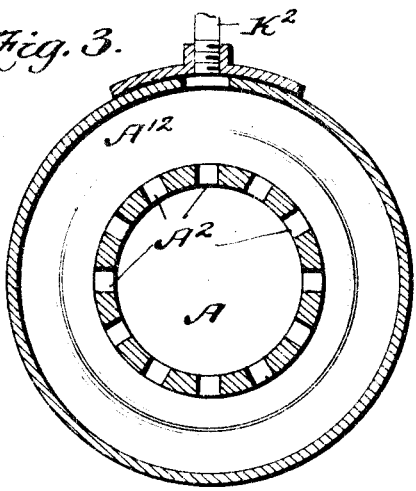
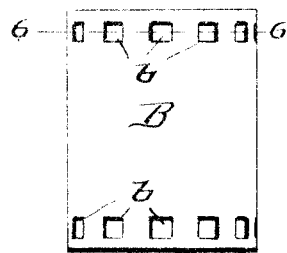
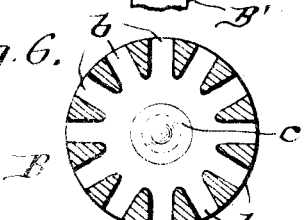
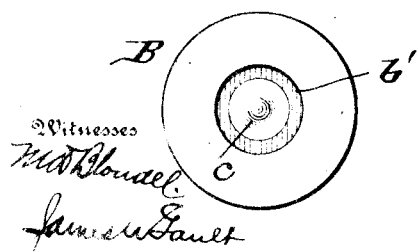
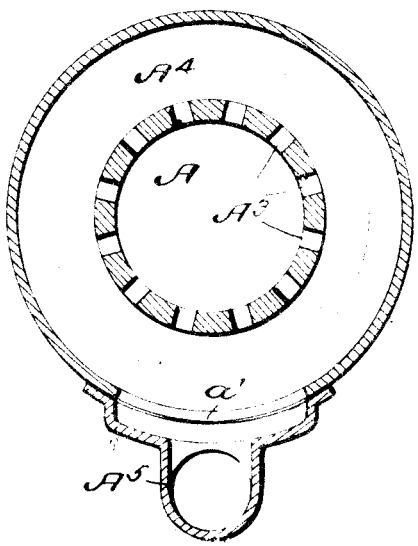
Inventor
Simon Lake.

S. LAKE.
INTERNAL COMBUSTION ENGINE.
APPLICATION FILED NOV. 21, 1912.

1,095,002.

Patented Apr. 28, 1914.
3 SHEETS—SHEET 3.

Inventor
Simon Lake.
by
Wm H. Funnel
Attorney

Witnesses
M. T. Blondel
James W. Gauer

UNITED STATES PATENT OFFICE.

SIMON LAKE, OF MILFORD, CONNECTICUT.

INTERNAL-COMBUSTION ENGINE.

1,095,002.

Specification of Letters Patent. Patented Apr. 28, 1914.

Application filed November 21, 1910. Serial No. 593,562.

*To all whom it may concern:*

Be it known that I, SIMON LAKE, a citizen of the United States, residing at Milford, in the county of New Haven and State of Connecticut, have invented certain new and useful Improvements in Internal-Combustion Engines, of which the following is a specification.

This invention relates to certain improvements in the construction of internal combustion engines shown and described in my copending application, filed March 22, 1910, Serial No. 551,018.

The object of the invention is to provide a simple, compact and highly efficient single or double acting valveless internal combustion engine that is designed especially for use in vessels and spaces of restricted area where high power is required.

To this end the invention consists in the combination of a power cylinder and an air compression cylinder, wherein the power cylinder has a plurality of air inlet ports disposed centrally in the walls thereof, and a plurality of outlet or exhaust ports that are arranged adjacent to said air inlet ports whereby all of said ports are controlled by the power piston operating in the power cylinder so that on each stroke in the double acting engine, the exhaust ports are first opened to permit the exhaust of the products of combustion resulting from the explosion of the charge that has driven the piston on its stroke, compressed air then being admitted to drive out any remaining products of combustion and thoroughly scavenge the cylinder, and to supply the cylinder with a charge of fresh clean air which with the fuel admitted provides a combustion charge that may be ignited either through the compression within the cylinder or by means of a sparking plug as desired.

The invention further consists in the novel arrangement of the air compressor whose piston is operated by the power piston the air compressor piston being connected with the crank shaft to rotate the same independently of any direct connection between the power piston and the crank shaft; the arrangement of a storage tank into which the air is compressed and from which the power cylinder is supplied with air for the purposes stated; in the compact arrangement of the cylinders and the several parts whereby the engine is particularly adapted for use in vessels and spaces of restricted area; and other features germane to these several features, as will now be described and then particularly pointed out in the claims.

Figure 9:
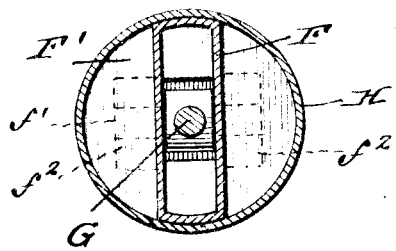
Figure 10:
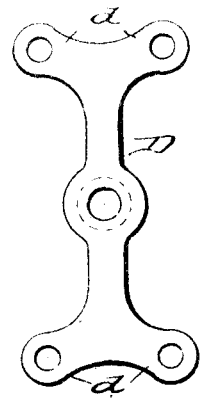

In the accompanying drawings, in the several figures of which like parts are similarly designated, Figure 1 is a vertical transverse section of my improved engine. Fig. 2 is a vertical section drawn on a slightly larger scale through the power cylinder illustrating the staggered arrangement of the air inlet and the exhaust ports. Fig. 3 is a horizontal section drawn through the air inlet ports of the power cylinder on the line 3—3 of Fig. 2. Fig. 4 is a similar view drawn through the exhaust ports on the line 4—4 of Fig. 2. Fig. 5 is a side elevation of the power piston. Fig. 6 is a horizontal section drawn on the line 6—6 of Fig. 5. Fig. 7 is a plan view of the power piston. Fig. 8 is a vertical longitudinal section drawn through the air compression cylinder on the line 8—8 of Fig. 1. Fig. 9 is a horizontal section drawn on the line 9—9 of Fig. 8. Fig. 10 is a plan view of the cross-head through which the piston rod of the power piston and the air compression trunk-piston are connected.

A designates a water jacketed power cylinder, having an integral upper head $a$ and a removable lower head $A'$. The side walls of the cylinder are provided with a plurality of centrally arranged inlet ports $A^2$ which are arranged in horizontal alinement around the entire bore of the cylinder and which communicate with an annular passage $A^{12}$ formed in an enlargement cast upon the exterior of the cylinder. Adjacent to the said inlet ports upon each side thereof and in staggered relation to said inlet ports are sets of exhaust ports $A^3$ formed in the side walls of the cylinder, and communicating with an annular passage $A^4$ formed in said enlargement on each side of the air passage $A^{12}$. The air passage $A^{12}$ communicates with a compressed air tank K as will be hereinafter described, and the exhaust passages communicate through ports $a'$ with a manifold $A^5$ through which the exhaust gases are conducted to any convenient place for final discharge to the atmosphere.

Operating in the power cylinder A is a power piston B in each end of which is arranged a series of passages or ports $b$ that are designed to register with the air inlet ports $A^2$ when the piston reaches the end of each stroke and through which compressed air is led into the cylinder A. The passages $b$ of the respective series merge into central openings $b'$ which are formed in the ends of the piston and open into the power cylinder and through these central openings the air escapes into the cylinder to drive out the products of combustion and to supply the cylinder with fresh charges of air.

$B'$ designates the piston rod of the power piston which extends downwardly through the opening $b'$ in the lower end of the piston and through the lower head of the cylinder. The upper end of the piston rod is held to the piston by a screw $c$ whose head is substantially cone-shape and against which the in-rushing air strikes and is deflected upwardly in the center of the cylinder toward the upper head $a$ against which it strikes and is then deflected downwardly along the sides of the cylinder and finally escapes along with any remaining products of combustion, through the exhaust ports $A^3$ thereby thoroughly scavenging the cylinder. Likewise at the lower end of the cylinder the in-rushing air strikes against the piston rod $B'$ and is deflected in the same manner as described in respect to the upper end of the cylinder.

The lower end of the piston rod $B'$ is connected to a cross-head $D$ which fits well down between the crank arms $e$ of the power shaft $E$ when the piston $B$ is in its extreme lowermost position. The ends of the cross-head $D$ branch out into lateral extensions $d$ to which are connected downwardly extending stud-bolts or short columns $D'$ to the lower ends of which are connected the outer ends of outwardly extending portions $F^2$ of a casing $F$, which casing is formed integral with and extends from a trunk-piston $F'$. The casing forms a well in which operates a pitman rod $G$ that is connected at its upper end to the crank pin $e'$ of the power shaft $E$. At its lower end the said pitman rod is connected to a wrist pin $f'$ that is journaled in bearings $f^2$ secured to the bottom of the piston $F'$. The piston $F'$ operates in a compression cylinder $H$ that is formed at its upper end with oppositely disposed upwardly and outwardly extending arms or brackets $H^2$ which terminate at their upper end in outwardly extending horizontal portions $h^3$ that rest upon supporting beams $I$ which also form supports for the bearings $J$ of the power shaft $E$. By this arrangement it will be seen that the power cylinder and the air compression cylinder are arranged closely together, and yet permitting the employment of a long pitman rod whereby a long stroke of the power piston is obtained without excessive height of the engine as a whole. The upper end of the compression cylinder is closed by a removable head $H'$ that is preferably made in halves to facilitate the assembling of the various parts and the trunk section of the piston is surrounded by a packing head $h$ that fits down into an annular recess formed by an annular flange $h'$ that extends upwardly from the head $H'$. The lower end of the compression cylinder is also closed by a removable head $H^3$ that is formed with a central depression to receive the bearings $f^2$ carried by the piston $F'$ when said piston is in its lowermost position.

$K$ designates a compressed air receiving tank into which the air is compressed from the compression cylinder. The tank $K$ is connected with the upper and lower ends of the said cylinder by means of pipes $K'$ which are connected at their outer ends to valve casings $k$ that communicate with opposite ends of the compression cylinder through ports $K^x$. The casings $k$ are provided with outwardly opening check valves $k'$ to prevent back flow of the air into the cylinder.

$L$ designates inwardly opening check valves held in valve casings $L'$ that communicate with the ends of the cylinder $H$ through ports $l$. The upper end of the receiving tank $K$ communicates with the annular air passage $A^{12}$ through a pipe $K^2$ in which is arranged a check valve $k^2$.

$M$ designates supporting columns for the power cylinder $A$ that rest upon the bearings $J$ of the crank shaft.

Oil is introduced into the power cylinder $A$ through supply pipes $N$ which preferably extend from a force pump (not shown) but which may extend from any suitable source of supply.

$O$ designates sparking plugs that extend through the heads of the power cylinder.

The operation of the engine is as follows: Assuming the engine to be running and that the power piston has reached the end of its lower stroke as shown in Fig. 1 it will be seen that the ports $b$ of said piston communicate with the air inlet ports $A^2$ of the power cylinder $A$ permitting ingress of air from the compressed air receiving tank $K$ which air strikes against the cone shape head of the screw $c$ and is deflected upwardly against the upper head of the power cylinder and is thence deflected downwardly as indicated by the arrows in Fig. 1. Now upon the return stroke of the power piston both the inlet and the exhaust ports are first closed and the air trapped in the upper end of the cylinder is compressed with oil that is admitted into the cylinder at any time from the commencement of the up stroke of the piston, and this compression continues until the piston has reached its extreme upper position by which time the oil has been thoroughly disintegrated and converted into a combustible mixture which then ignites through the heat of the highly compressed air and drives the piston on its return or down stroke. When the engine is used as a double acting engine, the same operation is repeated. Now as the piston nears the end of its upward stroke the exhaust ports $A^3$ that communicate with the cylinder below the lower end of the piston will be first uncovered which allows the products of combustion to rush out into the annular passage and escape through the manifold, then upon a further movement of the piston the ports or passages $b$ in the lower end of the piston will be brought into register with the air inlet ports $A^2$ and the moment the pressure in the cylinder is reduced below that of the pressure in the air receiving tank, fresh air will rush into the cylinder to first drive out the remaining products of combustion and then supply the cylinder with a charge of fresh clean air which is compressed along with the oil upon the next down stroke as previously described in respect to the up movement of the piston. By staggering the inlet and exhaust ports, that is, arranging them out of vertical alinement, the solid portions of the piston between the ports $b$ keep the exhaust ports ($A^3$) closed until they are uncovered by the ends of the piston, so that the air is prevented from entering the cylinder until the ports $b$ are brought into register with the inlet $A^2$ thus preventing any possibility of the air inlet and the exhaust ports being thrown into communication except through the central openings $b'$ in the piston and then only after the pressure in the power piston has been reduced below that of the air receiving tank, at which time the check valve in the pipe communicating with the receiving tank and the annular air passage, will be automatically opened and the pressure in the tank will cause the air to rush through the ports in the piston into the cylinder.

The engine may be adjusted to operate as a single acting engine by cutting off the fuel supply from either end of the cylinder, and the air that is drawn into and compressed in the compression cylinder is forced into the receiving tank K, from which it escapes into the power cylinder through the ports $A^2$ the moment the latter have been uncovered by the power piston. When the exhaust ports are first opened some of the products of combustion will escape by reason of the fact that the pressure in the cylinder is greater than atmospheric pressure, and hence the gases and some of the products of combustion will rush out through the ports the moment they are uncovered. The pressure in the cylinder being thus reduced, the moment the air inlet ports $A^2$ are opened compressed air from the receiving tank will rush into the cylinder through the passages or ports $b$ in the piston and striking against the cone member $c$ will be deflected upwardly in the center of the cylinder toward the cylinder head against which it strikes and is again deflected downwardly to finally escape through the exhaust ports and thus drive out all remaining products of combustion, or in other words, thoroughly scavenging the cylinder. When the engine is adjusted to run as a double acting engine, both fuel inlets being open, a similar operation takes place at each end of the cylinder and on each stroke of the piston.

During the upward movement of the air compressing piston F' the air that has been drawn into the upper end of the compression cylinder H during the previous down stroke of the piston F' will be compressed and forced into the receiving tank K and likewise on the down stroke of the compressing piston the air in the compression cylinder below the piston F' will be compressed and forced into the receiving tank. It will thus be seen that the engine is exceedingly simple in construction, that there are no inlet or exhaust valves required for its operation which thus permits of the dispensing with the gearing for operating such valves, and that by the construction shown the control of the ports is entirely automatic. While I have shown the engine equipped with ignition devices I desire it understood that they may be cut out of operation with the use of certain grades of oils or fuel and the charge of the fuel may be ignited through the heat of the highly compressed air within the power cylinder. It will also be seen by reference to Fig. 1 of the drawings that the area of the air compressing cylinder is greater than that of the power cylinder so that more air may be compressed than is required for the charge that is used for fuel purposes.

What I claim is:—

1. In a double acting internal combustion engine, a power cylinder having a single set of air inlet ports arranged centrally in the walls thereof in horizontal alinement throughout the bore of the cylinder and a plurality of exhaust ports arranged above and below said air inlet ports and out of vertical alinement with said air inlet ports, a power piston operating in said power cylinder having passages or ports adjacent to each end that are designed to register with said single set of air inlet ports when the piston reaches the end of each stroke, and a centrally arranged opening at each end of the piston communicating with said air passages or ports and the opposite ends of said cylinder, a piston rod extending from one end of the power piston through the opening in said end, and a conical member for distributing the incoming air arranged in the opening at the opposite end of said piston and adapted to hold said piston rod in said piston, means for conducting air under pressure to said air inlet ports, and a fuel supply for said power cylinder.

2. In an internal combustion engine, a power cylinder having a series of air inlet ports arranged in the walls thereof and in horizontal alinement mid-way between the heads of said cylinder, and a series of exhaust ports arranged above and below said inlet ports and in horizontal alinement but out of vertical alinement with the air inlet ports, an enlargement formed upon the exterior of the cylinder having an annular passage communicating with each set of ports, a power piston operating in said cylinder, said piston having a series of passages adjacent to each end that are designed to register with said air inlet ports when the piston reaches the end of each stroke, and a central opening in each end communicating with adjacent passages and ends of the cylinder, a piston rod extending from one end of the piston through the opening in said end, a conical member arranged in the opening at the opposite end of the piston, a crosshead connected to the lower end of said piston rod, an air compressing trunk-piston carried by said cross-head, an air compression cylinder in which the trunk piston operates, a crank shaft, a pitman connecting said air compressing piston with the crank of said shaft and adapted to rotate said crank shaft independently of the power piston, an air receiving tank communicating at one end with said air compression cylinder and at its opposite ends with said air passage of said power cylinder, and a fuel supply for said power cylinder.

3. An internal combustion engine, comprising a power cylinder having a series of air inlet ports and series of exhaust ports arranged in the walls thereof intermediate the heads of said cylinder, a power piston operating in said cylinder having passages that register with said air inlet ports when the piston reaches the end of each stroke, each end of said piston having a central opening communicating with adjacent passages and ends of the power cylinder, a piston rod carried by said power piston, a cross head connected to the outer end of said piston rod, an air compressing trunk-piston carried by said cross-head, a crank shaft, a pitman connected to the lower end of said trunk-piston and to the crank of said crank shaft and adapted to rotate said crank shaft independently of the power piston, a compression cylinder in which the trunk piston operates, an air receiving tank, valve controlled pipes connecting the opposite ends of said compression cylinder with said receiving tank, a valve controlled pipe extending from said tank to said inlet port of the power cylinder, and a fuel supply for each end of said power cylinder.

In testimony whereof I have hereunto set my hand this 17th day of November, A. D. 1910.

SIMON LAKE.

Witnesses:
JAMES W. GAULT,
M. D. BLONDEL.